May 23, 1972 M. M. ESKAY 3,664,603

MEANS FOR CONVERTING MAGNETIC TAPE CASSETTE TO AUDIO-VISUAL CASSETTE

Filed June 1. 1970

INVENTOR
MARION M. ESKAY
BY
Hubbell Cohen & Stiefel
ATTORNEYS.

United States Patent Office 3,664,603

Patented May 23, 1972

3,664,603

MEANS FOR CONVERTING MAGNETIC TAPE CASSETTE TO AUDIO-VISUAL CASSETTE

Marion M. Eskay, Scarsdale, N.Y., assignor to Hubbell, Cohen & Stiefel, New York, N.Y.

Filed June 1, 1970, Ser. No. 41,993
Int. Cl. G03b *1/04*; G11b *15/32*
U.S. Cl. 242—180 17 Claims

ABSTRACT OF THE DISCLOSURE

An attachment for a standard magnetic tape cassette (and the composite product resulting therefrom) which attachment includes a pair of rotatable splined shafts connectable with the toothed hubs of the spools of the standard tape cassette for rotation therewith, the splined shafts having a pair of spools thereon with an indicia bearing tape extending therebetween. Guide means are also included for guiding the indicia bearing tape from one spool to the other. The indicia bearing tape may be provided with visual indicia such as lettering, or with tactile indicia such as for braille, whereby to convert a standard magnetic tape cassette into an audio-visual or audio-tactile instruction device.

BACKGROUND OF THE INVENTION

Field of the invention

This invention relates to an attachment for a standard magnetic tape cassette for converting that cassette into an instructional device one output of which is audio and the other of which is either visual or tactile, and to the audio-visual (or tactile) cassette resulting therefrom.

The prior art

Standard magnetic tape cassettes are well known. Such a cassette is described and claimed in U.S. Pat. No. 3,272,325, and the present invention relates to an improvement on such a magnetic cassette. Such a cassette provides only an audio output from the magnetic track on the tape itself.

There are numerous forms of audio-visual instruction devices that are well known. However, these devices are either very costly or difficult to program for individual instructional needs.

SUMMARY OF THE PRESENT INVENTION

A standard tape cassette includes an enclosure in which are rotatably mounted two spools, one a feed spool and the other a takeup spool. The hubs of the two spools are hollow and toothed in order to provide a convenient coupling between the spools and the capstans of a tape recorder. Clearly the housing for the spools is provided with registered apertures in order to enable the capstans to pass through the housing and engage the two spools above mentioned. Such a cassette is fully described in the aforementioned U.S. Pat. No. 3,272,325 or 3,394,899.

The attachment of the present invention comprises an upper and lower suppport plate in which are rotatably supported a pair of vertically extending splined shafts which are spaced apart a distance equal to the standard spacing between the two hubs of the spools on a standard cassette. The shafts extend outwardly beyond the lower support plate to enable them to be inserted into the interior hubs of the spools of the standard cassette to couple them thereto. Thus the shafts will rotate with the spools of the standard cassette. Mounted on the splined shafts between its support plates are a pair of spools with a tape extending therebetween. The tape may pass over various guide means and, if the attachment is enclosed in a housing, somewhere during the path of movement will register with an opening in that housing. The tape may be provided with visual indicia, such as lettering, which indicia is automatically synchronized with the audio track of the magnetic tape in the cassette so that a fully synchronized audio-visual output is achievable. In lieu of visual indicia, tactile indicia, such as braille, may be applied to the tape of the attachment. In lieu of an attachment, a new audio-visual cassette may be made which is made and sold as a unit, which unit embodies the synchronized magnetic and visual or tactile indicia.

The combination of the standard magnetic tape cassette and the attachment of the present invention, or the unitary product embodying substantially the same structure, is easily programmed for indivdual instruction. Thus, the non-magnetic tape may be removed from the attachment and provided with visual indicia, as by typewriting. It is then replaced. The cassette tape recorder is then conditioned to record on the magnetic tape. The two tapes are then advanced automatically in synchronism. As a word appears, the instructor sounds it whereby to record it. Thus upon the tapes being run through, they each have related indicia which, upon replay, will sound and appear in synchronism, the two tapes always moving in unison. Clearly in addition to utilizing the device for spelling or reading instruction, the device may be used for mathematics, foreign language instruction and many other types of subject matter learning, or for entertainment.

DETAILED DESCRIPTION OF THE PREFERRED EMBODIMENTS

Figures 1, 2:
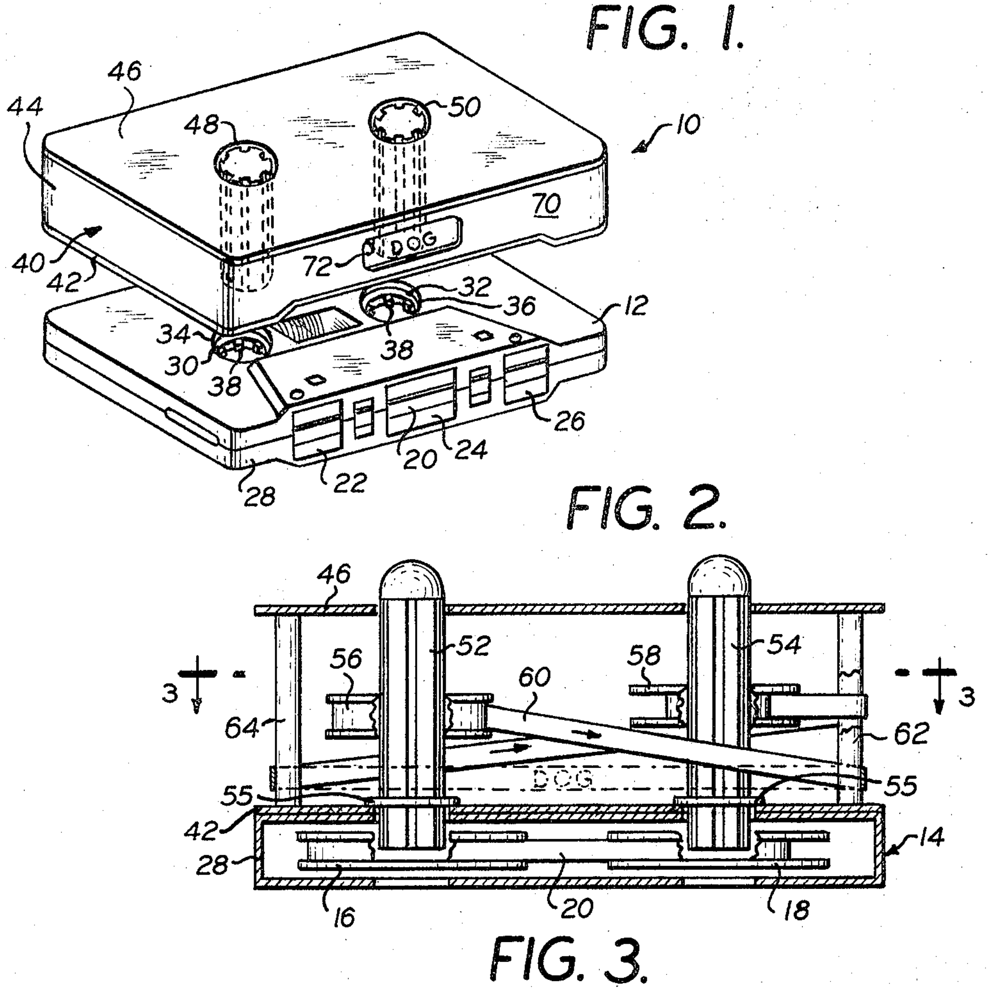
FIG. 1 is a perspective view of a standard magnetic tape cassette with an attachment embodying the present invention.
FIG. 2 is a vertical sectional view of an assembled standard tape cassette and the attachment.

The following detailed description will be made with respect to an attachment for a standard magnetic tape cassette, such as may be seen in U.S. Pat. No. 3,272,325, which is hereby incorporated by reference. However, it should be borne in mind throughout the description that in lieu of the invention residing in an attachment for such a cassette, a new form of audio-visual cassette sold as an entity or unit can be made embodying the present invention. Thus, the invention may be viewed as a new audio-visual cassette rather than as a visual (or tactile, in the case of braille) attachment for a standard audio cassette. However, for the sake of simplicity, the main description will be directed to an attachment.

Referring now to the drawings in detail, an attachment 10 for a standard magnetic tape cassette 12 is illustrated. The standard tape cassette 12 which may be of any of the well known types of standard tape cassettes commonly referred to as a "Phillips" type cassette as shown and described in U.S. Pat. No. 3,272,325, comprises an enclosure 14 in which are rotatably mounted a feed reel or spool 16, take-up reel or spool 18 for magnetic tape 20 which is guided through the cassette 12 to register with openings 22, 24, and 26 in the peripheral side wall 28 of the housing 14 where it comes into contact or close proximity to a read head, a write head, and an erase head of a standard cassette type tape recorder. The reels 16 and 18 have hollow hubs 30 and 32, respectively, which hubs register with apertures 34 and 36 in the housing 14. The interior of the hubs 30 and 32 are provided with teeth 38 for positive interengagement with complementary splined or toothed spindles on the tape recorder for driving the reels 16 and 18.

The attachment 10 comprises an enclosure 40 including a bottom 42, a peripheral side wall 44 and a top 46, the latter of which is preferably removable when desired. The top 46 and the bottom 42 when in enclosing relation with the peripheral side wall 44 are provided with a pair of registered apertures 48 and 50 which serve as bearings for a pair of splined shafts 52 and 54, respectively, which splined shafts protrude above the top 46 a small distance and which protrude beneath the bottom 42 an even greater distance for reasons which will become apparent hereinafter. Shafts 52 and 54 may be provided with a collar or bushing 55 to prevent unwanted downward movement thereof. Pressed on to the shaft 52 is a feed reel 56 and pressed on to the shaft 54 is a take-up reel 58. Extending from the feed reel 56 to the take-up reel 58 is a tape 60 which tape is here shown to be suitable for receiving visual indicia such as writing thereon, although the tape would also be satisfactory for and useable with tactile indicia such as braille writing.

Figure 3:
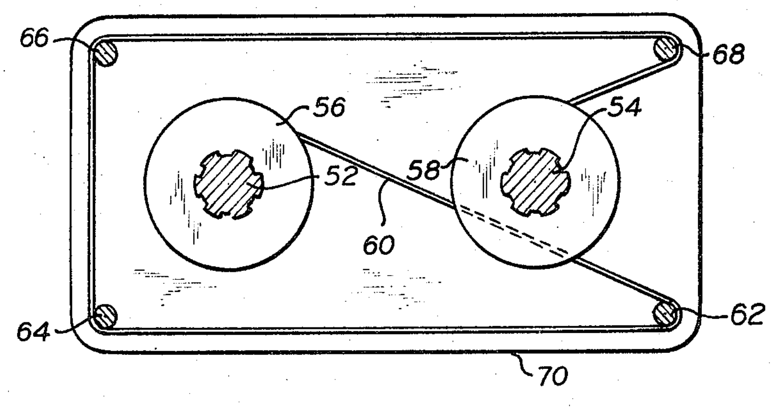
FIG. 3 is a sectional view taken along the line 3—3 of FIG. 2.

Preferably, and as shown, the attachment 10 is provided with four guideposts 62, 64, 66 and 68 positioned close to the corners of the housing 40 therefor which guideposts serve to define a path for the tape 60 from the feed reel 56 to the takeup reel 58 and, if there is no peripheral side wall 44 included, as spacers and connectors between bottom plate 42 and top plate 46. Specifically, as presently preferred and as shown best in FIG. 3, the tape 60 comes off the feed reel 56 and passes around the guidepost 62 substantially 180° and thence parallel to the front wall 70 of the peripheral side wall 44 of cassette closure 40 where it passes in register with an opening or window 72 in the front wall. Beyond the opening 72, the tape 60 passes around guidepost 64, guidepost 66 and guidepost 68 and then on takeup reel 58.

The path of movement of the tape 60 from right to left past window or opening 72 is desirable when the indicia bearing tape 60 has writing on it. However, other forms of indicia, such as pictures for example, might be preferable moving from left to right past the window 72. In such an event the tape 60 would be routed along a different path than that illustrated for FIGS. 2 and 3.

It will be obivous that the shafts 52 and 54 protrude sufficiently below the bottom 42 of closure 40 to enable the shafts to pass within the openings 34 and 36 in the top of cassette 12 so that the splined shafts which are complementary to hubs 30 and 32 may interengage with the teeth 38 on the hubs in order to couple the attachment 10 to the cassette 12 for movement of the magnetic tape 20 and the tape 60 in unison.

As shown and as presently preferred, the shafts 52 and 54 are spaced apart a distance equal to the spacing of the hubs 34 and 36 of the casette 12 in order to enable a direct coupling between attachment 10 and casette 12. However, if desired, the shaft on which the reels 56 and 58 are mounted may be spaced apart a different distance than the distance between the magnetic tape cassette reels 16 and 18 and gear train or the like could be interposed between the shafts that bear reels 56 and 58 and splined stubs which would be connectable with reels 16 and 18. Such an arrangement could also be employed to provide for the linear speed of the indicia bearing tape 60 to be different from the linear speed of magnetic tape 20.

As shown and as preferred, tape 60 has the same thickness as tape 20 whereby to insure synchronism between them and common linear speeds throughout the entire operation. In the event that the indicia bearing tape 60 is of a different thickness than the magnetic tape 20, it is desirable to detach the feed reel of the tape 60 from the feed reel of the tape 20 so that the feed reel of the tape 60 will idle and will be able to rotate at a different angular speed than the feed reel of the tape 20. This requirement is desirable during normal operation and during the time that the tapes are being rewound.

Provision for such detachment can be made readily by slidably disposing the shafts 52 and 54 on bottom 42 and top 46 and providing each of the shafts with a manually grippable knob 53 and 55, respectively, which knobs may beg rasped to retract one or the other of the shafts 52 or 54. Thus, for example, during ordinary operation, when reel 56 is the feed reel for attachment 12 and reel 58 serves as the takeup reel, if the thickness of tape 60 is appreciably different from the thickness of tape 20, it is desirable for the user to grasp knob 53 and pull shaft 52 upward to detach it from hub 34 of reel 16 of casette 12. Shaft 54 will remain connected to reel 18. When the cassettes are operated by the tape recorder, reel 18 and reel 58 will be driven and these will pull tapes 20 and 60 respectively, off of feed reels 16 and 56 which feed reels will be free to rotate at different angular speeds.

When rewinding the cassettes, the user will grasp the knob 53 and depress it to move splined shaft 52 into engagement with the hub of reel 16 and will pull on knob 55 to disconnect shaft 54 from reel 18. Then the cassettes can be rewound during which rewinding operation reels 18 and 58 will rotate at different angular speeds. It should be noted that synchronism is always maintained, both on normal play and on rewind. Thus, it is not necessary to rewind both tapes to their starting points to obtain synchronism. The user may rewind for any desired distance, and then resume normal forward play, the two tapes remaining in synchronism. This gives the user an automatic search capability, by relying on the indicia to inform him of where he is on the magnetic tape.

Obviously, in lieu of the manually operable knobs 53 and 55, some form of interlocked linkage operated by a single operating member, such as a pivoted lever, could be employed to effect the alternate engagement and disengagement of shafts 52 and 54 with reels 16 and 18, respectively. However, as previously noted, the need for such a provision can be eliminated by making sure that the tapes 60 and 20 are of the same thickness.

Thus, with the attachment 10 coupled to the cassette 12 as shown in FIG. 2, the cassette 12 may be placed in a standard cassette tape recorder to couple the spindles of that tape recorder to reels 16 and 18. Assuming both the magnetic tape 20 and the tape 60 are substantially fully on their feed reels 16 and 56, respectively (that is both tapes are in their starting positions), the tape recorder can be conditioned to record on the magnetic tape 20 in the normal fashion and the tape can be advanced. The advancement of tape 20 will simultaneously result in an advancement of tape 60 at the two taps will move in unison and preferably at the same linear speed. The user can then permit some length of both tapes 20 and 60 to advance and then, through opening 72, write on tape 60 a suitable word such as, for example, "dog." The tape recorder may now be reversed a short distance and then conditioned for recording and then the tapes can be advanced. As the word "dog" appears in the opening 72 of closure 40, the instructor will pronounce the word "dog" to record it on the magnetic tape 20, so that on subsequent playbacks of the cassette and attachment, when the word "dog" appears in window 72 the word "dog" will sound from the tape recorder. After performing the operation with respect to the word "dog," the instructor can advance both tapes 20 and 60 a short distance to remove the word "dog" from view through opening 72 and to expose a new piece of tape 60 to write a second word thereon. The instructor can then reverse both tapes by reversing the tape recorder, then condition the recorder for recording, and then advance tapes 20 and 60 until the second word starts to appear in the opening 72 where-upon the instructor can record the second word on the magnetic tape 20. The above steps can be repeated until the full tapes 20 and 60 are consumed. Thereafter, complete automatic synchronism between the audio and visual indicia is assured upon subsequent playbacks by a student.

Another method, presently preferred, for conditioning the combined visual attachment 10 with the tape cassette 12 is achievable when, as previously indicated, the top 46 of the closure 40 for attachment 10 is removable. When the top 46 is removed, the instructor is able to take out the tape 60 by sliding spools 56 and 58 off of their respective shafts 52 and 54. Then the instructor may write or type or otherwise place on tape 60 the desirable visual indicia such as words, pictures, numbers or the like. These may be placed along the entire length of the tape. Then the tape may be repositioned within the enclosure 40 by remounting spools 56 and 58 on shafts 52 and 54 with the tape 60 in its starting position, substantially fully wound on the feed reel or spool 56. Clearly the tape 60 is preferably snaked around the various guideposts 62, 64, 66 and 68 in order to assure registration of the indicia thereon with the opening 72 in front wall 70. The instructor then conditions the tape recorder to record, and commences to advance the magnetic tape 20 and hence the visual indicia bearing tape 60. As each of the visual indicia appears in the opening or window 72 of the closure 40, the instructor will record the necessary word or words related to the indicia on the tape. Thus automatic synchronism is achieved.

While the above description has specified several means of applying indicia to the indicia bearing tape 60 and coordinating the indicia with a sound track on the magnetic tape 20, it will be obvous that the user need not be required to program his own attachment 10 or his own composite audio-visual cassette. Instead, such attachments or composite cassettes can be pre-programmed at a central programming plant or factory or the like and sold as a completed unit.

Figure 4:
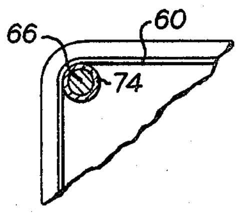
FIG. 4 is a fragmentary view similar to FIG. 3 showing a modification thereof.

While it is desirable and presently preferred to enclose the entire attachment in a closure 40, it will be obvious that the peripheral side wall 44 can be dispensed with without departing from the present invention. In such an embodiment of the attachment 10, the guideposts 62–68 may serve as spacers between upper plate 46 and lower plate 42 of the attachment 10 which plates are both desirable for providing proper support and bearing for the splined shafts 52 and 54. Further, if desired, with either of the two embodiments of the attachment, that is the enclosed embodiment shown in FIG. 1 or the embodiment without the peripheral side wall as just described, if too much friction is encountered between the tape 60 and the guideposts 62–68, sleeves 74 may be rotatably positioned about the guideposts for engagement with the tape 60 which sleeves will rotate as the tape 60 moves through the attachment 10. Such a modification is shown in FIG. 4 with respect to the guideposts 66.

It also will be appreciated that the present invention need not be an attachment for a standard cassette but could be manufactured as a unitary audio-visual cassette instead of as an attachment for a magnetic or tape cassette. In such n embodiment, it would be desirable that the top of the tape cassette 12 and the bottom 42 of the visual portion of the unitary product be merged to perform the function of a support for guideposts 62–68 and a bearing for the rotatable shafts 52 and 54 which shafts may now be formed integrally with the tape reels 16 and 18, if desired, or separately therefrom as in the embodiments shown in FIGS. 1 and 2. However, it would be desirable even in such a unitary combined audio-visual cassette, to have the upper wall of the combined cassette, that is the wall 46, removable from the remainder of the cassette closure in order to enable the removal of the tape 60 for the placement of visual or tactile indicia thereon or to substitute one tape 60 for another. The method of placing indicia on the tape 60 and on the tape 20 can be the same as that above described with respect to the separate attachment.

While the above description has been made primarily with respect to visual indicia such as lettering, pictures, numbers or the like, as already suggested, it should be noted that the indicia on tape 60 could very well be tactile, such as braille indicia, and in such form the combined cassette or the tape cassette and attachment could serve as an excellent instructional device for learning braille.

Throughout the description the indicia on the indicia bearing tape 60, especially when it is visual, has been presumed to be front lighted and directly readable through the opening or window 72. However, it is within the scope of the present invention to have the indicia bearing tape 60 translucent or transparent and to provide for back lighting within the attachment 10. Alternatively an optical projection system could be incorporated so that the visual indicia, instead of being directly read at the opening or window 72, could be projected onto a screen from which it would be viewed.

While I have herein shown and described the preferred form of the present invention and have suggested modifications thereof, other changes and modifications may be made therein within the scope of the appended claims without departing from the spirit and scope of this invention.

What is claimed is:

1. An attachment for a magnetic tape cassette of the type having a magnetic tape feed reel enclosed in a casing having a pair of substantially planar members between which said reel is located, and a peripheral side wall, said reel having a hollow hub for connection with the spindle of a tape recorder and said substantially planar members each having an aperture therein in register with said hub; said attachment comprising:

- a pair of spaced apart support members;
- a shaft extending between said support members and being rotatably mounted thereon;
- an indicia tape feed spool mounted on said shaft for rotation therewith, and means for connecting said shaft to said hollow hub for concomitant rotation, and guide means for guiding said indicia bearing tape past an indicia read station.

2. The attachment of claim 1, wherein said means for connecting said shaft to said hub comprises a toothed hub and a complementary splined shaft.

3. The attachment of claim 1, said attachment further comprising a peripheral side wall between said support members and having an aperture therein to define said indicia read station.

4. The attachment of claim 1, wherein one of said support members is removable, and said attachment feed spool is also removable.

5. The attachment of claim 1, wherein said means for connecting said shaft to said hub comprises a toothed hub and a complementary splined shaft, one of said support members is removable, and said attachment feed spool is also removable, and said attachment further comprising a peripheral side wall between said support members and having an aperture therein to define said indicia read station.

6. The attachment of claim 1, for a cassette further comprising a take-up reel offset from said feed reel, said takeup reel also having a hollow hub, and said substantially planar members further having second apertures in register with said takeup reel hub; said attachment further comprising:

- a second shaft extending between said support member and rotatably mounted thereon and offset from said first shaft a distance equal to said distance between the hub of said two reels in said magnetic tape cassette,
- an indicia tape take-up reel mounted on said second shaft for rotation therewith;

means for connecting said second shaft to said hollow hub of said magnetic tape take-up reel for concomitant rotation;

said guide means for guiding said indicia bearing tape to said take-up reel.

7. The attachment of claim 6, wherein said means for connecting said shafts to said hubs comprises said hubs being toothed and said shafts being complementarily splined.

8. The attachment of claim 6, said attachment further comprising a peripheral side wall between said support members and having an aperture therein to define said indicia read station.

9. The attachment of claim 6, wherein one of said support members is removable, and said attachment feed spools are both also removable from their respective shafts.

10. The attachment of claim 6, wherein said means for connecting said shafts to said hubs comprises said hubs being toothed and said shafts being complementarily splined, one of said support members is removable, and said attachment feed spools are both also removable from their respective shafts, said attachment further comprising a peripheral side wall between said support members and having an aperture therein to define said indicia read station.

11. The attachment of claim 6, wherein said guide means comprises a plurality of guide posts extending between said support members.

12. The attachment of claim 11, further comprising sleeves rotatably mounted on said guide posts.

13. An audio-visual cassette comprising:

first and second substantially planar substantially parallel spaced apart members, a magnetic tape feed reel and a magnetic tape take-up reel disposed between said planar members and rotatably mounted on one of them, an indicia tape feed reel and an indicia tape take-up reel disposed between said planar members and rotatably mounted on the other of them;

means connecting said feed reels to each other and said take-up reel to each other for concomitant rotation;

and guide means for guiding indicia bearing tape past an indicia read station.

14. The attachment of claim 13, wherein one of said planar members is removable, and said reel connecting means are detachable.

15. An audio-visual cassette comprising:

first and second substantially planar substantially parallel spaced apart members, a magnetic tape feed reel disposed between said planar members and rotatably mounted on one of them, an indicia tape feed reel disposed between said planar members and rotatably mounted on the other of them;

means for connecting said feed reels to each other for concomitant rotation;

and guide means for guiding indicia bearing tape past an indicia read station.

16. The attachment of claim 6, further comprising indicia bearing tape having a thickness equal to the thickness of the magnetic tape.

17. The attachment of claim 13, further comprising magnetic tape of said magnetic tape feed reel and indicia tape on said indicia tape feed reel, said magnetic tape and said indicia tape having substantially the same thickness.

References Cited

UNITED STATES PATENTS

| | | | |
|---|---|---|---|
| 2,911,882 | 11/1959 | Hicks | 242—200 X |
| 3,245,628 | 4/1966 | Swire | 242—180 |
| 3,558,142 | 1/1971 | Poessel | 274—4 |

LEONARD D. CHRISTIAN, Primary Examiner

U.S. Cl. X.R.

242—197